Patented May 27, 1952

2,597,951

UNITED STATES PATENT OFFICE 2,597,951

EMULSION POLYMERIZATION PROCESS

Hendrik Romeyn, Jr., Montclair, N. J., and Charles D. McCleary, Naugatuck, Conn., assignors to United States Rubber Company, New York, N. Y., a corporation of New Jersey No Drawing. Application October 28, 1950, Serial No. 192,828

4 Claims. (Cl. 260—45.5)

This invention relates to a process for the production of rubbery copolymers of butadiene and acrylonitrile having improved processing properties and giving, when homogeneously blended with thermoplastic resins compatible therewith, mixtures having improved physical properties, including greater freedom from roughness. More specifically, the invention relates to a process of making such rubbery copolymers having certain characteristics rendering them of unusual utility in the arts, namely a content of methyl ethyl ketone-insoluble gel of from 40 to 80%, said gel having a swelling index, measured in methyl ethyl ketone, of from 8 to 35, and a Mooney viscosity measured at 212° F., of from 40 to 80.

The copending application of Romeyn et al., Serial No. 159,942, filed May 4, 1950, which is a continuation-in-part of their prior application Serial No. 59,664 filed November 12, 1948, now abandoned, discloses a rubbery copolymer of butadiene and acrylonitrile having the above characteristics and properties as a new article of manufacture. The present invention relates to an improved way of making such a rubbery copolymer.

U. S. patent to Schoene 2,474,807 discloses the emulsion polymerization of synthetic rubber ingredients in the presence of not over 0.5% by weight of divinylbenzene, and expressly states that the use of more than 0.5% of divinylbenzene gives a virtually worthless product. Schoene's working examples deal solely with GR–S (butadiene-styrene rubbery copolymer) although he discloses that his invention is applicable to butadiene-acrylonitrile rubber.

We have found, by extensive experimentation and pilot plant production, that the statement in the Schoene patent that amounts of divinylbenzene in excess of 0.5% give a valueless product is not correct in the case of butadiene-acrylonitrile rubbery copolymers. On the contrary we have found that when making such copolymers the use of materially greater amounts of divinylbenzene than 0.5% based on monomers charged, namely from 0.7 to 1.5%, is essential to give a product having a methyl ethyl ketone-insoluble gel content of at least 40%, said gel having a swelling index in methyl ethyl ketone of from 8 to 35, and said product being also characterized by a Mooney viscosity, measured at 212° F., of from 40 to 80.

However, our experiments have shown that when from 0.7 to 1.5% of divinylbenzene, based on monomers charged, is introduced in the conventional manner, that is, when it is present from the initiation of polymerization until the termination of polymerization, generally speaking the resulting rubber is characterized by an excessively high content, generally well in excess of 80%, of methyl ethyl ketone-insoluble gel having the swelling index aforesaid. This is objectionable because the physical properties of the copolymer and of blends thereof with thermoplastic resins, particularly impact-resistance or toughness of such blends, are impaired. The rubbery copolymer so produced is also often characterized by an objectionably high Mooney viscosity which makes it difficult to process.

We have found a method of making rubbery copolymers of butadiene and acrylonitrile which are considerably better than those made by any process thus far known to the art. More specifically, we have invented a method whereby such a higher quality product can be consistently obtained.

Our method enables any selected value for methyl ethyl ketone-insoluble gel content (swelling index of from 8 to 35) of the rubbery copolymer of butadiene and acrylonitrile within the limits of 40 and 80% necessary for optimum physical properties to be consistently obtained and at the same time any desired value for the Mooney viscosity within the limits of 40 to 80, measured at 212° F., to be obtained in a reproducible manner.

The present invention is based on the discovery that a product having the gel content and Mooney viscosity values disclosed above can be obtained by subjecting the mixture of butadiene and acrylonitrile, in the conventional proportions, to aqueous emulsion polymerization, initiating the polymerization in the absence of any substantial amount of divinylbenzene or other cross-linking agent, thereafter adding from 0.7 to 1.5% by weight, based on the butadiene and acrylonitrile, of divinylbenzene at a time when from 10 to 35% of the original monomer mixture has been converted to polymer, continuing the polymerization, and stopping the polymerization at a time when at least 60% but not more than 80% of said original monomer mixture has been converted to polymer. We have found that the proportion of the aforementioned methyl ethyl ketone-insoluble gel in the resulting copolymer is roughly equal to the figure obtained by subtracting the per cent of conversion that has taken place at the time of addition of the divinylbenzene from 85%. Thus, by means of our invention it is easily possible to control the percentage of the gel formed in the product at any desired value within the above limits by simply controlling the point at which the divinylbenzene is added during the polymerization. At the same time, the product obtained by our invention has a Mooney viscosity within the limits of 40 to 80, as measured at 212° F., and thus meets the requirements of the trade in this respect.

In the preferred practice of our invention, the divinylbenzene is added at a time when from 20 to 30% of the monomeric mixture has been polymerized, and the polymerization is stopped when from 70 to 75% of the monomeric mixture has been polymerized.

The methyl ethyl ketone-insoluble gel content of a butadiene-acrylonitrile rubbery copolymer can be determined by extracting at room temperature in the dark for 24 hours thin strips of the rubbery copolymer with peroxide-free methyl ethyl ketone, which dissolves the sol portion of the rubber, leaving the gel undissolved. That portion of the methyl ethyl ketone-insoluble gel which cannot be changed by milling (either in the cold or at elevated temperature) to a form in which it is soluble in cold methyl ethyl ketone is herein referred to for convenience as "tight" gel. Tight gel is further characterized in that it has a relatively low swelling index, measured in peroxide-free methyl ethyl ketone.

The nature of the gel in the improved butadiene-acrylonitrile rubbery copolymer made by our invention can be determined by measuring the swelling index of the gel in peroxide-free methyl ethyl ketone. The swelling index is defined as the ratio of the weight of the gel sample when it is swollen with methyl ethyl ketone (as it will be at the conclusion of the solvent extraction referred to previously) to the weight of the gel sample after the methyl ethyl ketone has been evaporated therefrom. The swelling index of "loose" gel (which differs from tight gel in that it is rendered soluble by cold or hot mastication) is relatively high, commonly ranging from 100 upwardly while the swelling index of tight gel is low, not exceeding 35. Thus the swelling index is a measure of the type of gel present. The lower the swelling index, the tighter the gel, since the more nearly it approaches complete insolubility in methyl ethyl ketone or other solvents for the sol portion of the rubbery copolymer. Swelling indices less than 35 and particularly those which are less than 25 indicate complete or nearly complete absence of loose gel in the methyl ethyl ketone in soluble portion of the rubbery copolymer.

The specified ranges for gel content, gel swelling index and Mooney viscosity are critical and it is essential that they be observed. If any one of the three specified properties of the rubbery copolymer falls outside the range specified for that particular property, the processing characteristics or physical properties of the resulting copolymer or of the blends thereof with thermoplastic resins are seriously impaired in one or more respects. For example, if the methyl ethyl ketone-insoluble gel content is below 40%, the product has poor processing characteristics, is rough, and exhibits high shrinkage. If the swelling index is greater than 35, the processing characteristics are impaired; this is attributed to the presence of substantial amounts of loose gel which is undesirable from the standpoint of processability. We prefer that no substantial amount (not over 5% of the copolymer) of loose gel be present.

If the Mooney viscosity is lower than 40, processing characteristics are satisfactory, but the physical properties of the rubbery copolymer and of the blends with thermoplastic resins are seriously impaired. Thus the hardness, flexural strength, and modulus of the resulting blends are objectionably reduced. In addition rubbery copolymers having a Mooney viscosity below 40 are so soft that storage, shipping and handling are difficult because of the extreme tendency of the material to flow together upon standing for a short time. If the Mooney viscosity is materially above 80, either some physical properties, or the processability, or both, may be poor.

In practicing our invention, we simply follow conventional aqueous emulsion polymerization practice as commonly practiced for the preparation of rubbery copolymers of butadiene and acrylonitrile except that we add from 0.7 to 1.5%, and preferably approximately 1% (i. e. from 0.9 to 1.1%), of divinylbenzene, based on the sum of butadiene and acrylonitrile, after initiation of polymerization, at a point at which conversion has reached a selected value from 10 to 35% by weight based on the original monomeric mixture and we stop the polymerization at a selected value for conversion within the range of from 60 to 80%. The relative proportions of butadiene and acrylonitrile are the conventional ones which yield a rubbery copolymer. Usually we employ from 60 to 85% of butadiene and correspondingly from 40 to 15% of acrylonitrile, considering these two monomers alone. Known regulators, polymerization initiators and emulsifying agents are used. Conventional reaction conditions, including temperature, are used. When the extent of conversion of the monomers has reached a predetermined value within the range of from 60 to 80%, the reaction is terminated in the normal manner, typically by adding a known shortstopping agent, followed by removal of unreacted monomer, precipitation of the rubbery copolymer, which can be effected by the addition of metal salts such as calcium chloride, and washing and drying, all of which are carried out in the usual manner as in the preparation of ordinary butadiene-acrylonitrile rubbery copolymers.

While we are not limited by any theory as to the mechanism by which our invention operates to give our new results, we believe that when the divinylbenzene is added to the emulsified mixture of butadiene and acrylonitrile at a selected intermediate point in the reaction, after the butadiene and acrylonitrile have partially copolymerized, all of the polymer formed before addition of the divinylbenzene remains substantially free of tight gel, whereas the polymer formed after the divinylbenzene has been added consists principally of tight gel. Accordingly, the percentage of the desired methyl ethyl ketone-insoluble gel in the total polymer can be regulated by selection of the time at which the delayed addition of the divinylbenzene to the reacting charge is effected. Thus, the proportion of the desired gel in the final product decreases as the time of addition of the divinylbenzene is delayed. For example, if the divinylbenzene is added at 35% conversion of the acrylonitrile and butadiene charge, and the polymerization is then allowed to proceed to 75% conversion and is then shortstopped, the percentage of the desired gel in the final product will be roughly 50%. If the divinylbenzene is added at 10% conversion, and the polymerization is shortstopped at 75%, the content of desired gel in the product will be roughly 75%.

The manner of carrying out the process of the invention is illustrated by the following example:

Into a 10-gallon stainless steel autoclave was charged 946 g. (3 pts.) of a 28.5% paste of commercial sodium cetyl sulfate dissolved in 11,940 ml. (140 pts. total) of deionized water. Then 3920 ml. (35 pts.) of acrylonitrile was added, followed by 105 ml. (1.00 pt.) of tertiary dodecyl mercaptan and 23.9 ml. (0.20 pt.) of 7.9% cumene hydroperoxide solution. Finally, 5850 g. (65 pts.) of butadiene was added. The internal temperature of the autoclave was raised to 40° C. Samples of the reaction mixture were removed at hourly intervals and the total solids was measured. At 6.5 hrs. 15.8% total solids (28% conversion) was reached, 224 ml. (1.00 pt.) of divinylbenzene added in the form of a 44% solution in diethylbenzene was charged to the autoclave. The polymerization was then continued for 12.5 hours more at the end of which time the batch contained 34.3% total solids (74% conversion). The batch was cooled and excess butadiene was vented. The latex was withdrawn into glass vessels and 180 ml. of a 10% emulsion of dinitrochlorobenzene (0.2 pt.) was added to the latex as a shortstop. The latex was transferred to a tank equipped with a stirrer and 90 g. (1.0 pt.) of 2,6-di-tertiary-butyl-para-cresol in alcohol was added as an antioxidant. A solution of $CaCl_2$ was added to flocculate the latex to a crumb. The crumb was washed several times, then dried at 60° C. in a vacuum oven. The crumb was compacted by milling for 5 min. at 360° F. The Mooney viscosity of the polymer was 47. The polymer contained 30.4% acrylonitrile. Analysis showed the presence of 62% methyl ethyl ketone-insoluble gel with a swelling index of 32, measured in methyl ethyl ketone. The intrinsic viscosity of the soluble fraction was 0.57, measured in the same solvent.

The rubbery copolymer produced by our invention can be used by itself where rubbery butadiene-acrylonitrile copolymers are commonly used or it can be blended with ordinary butadiene-acrylonitrile rubbery copolymer. It is especially advantageous for blending either in the latex form or after coagulation, with thermoplastic resins, especially hard, normally inelastic, resinous thermoplastic copolymers of a major proportion of a styrene, such as styrene, p-methyl styrene, alpha-methyl styrene, alpha-methyl-p-methyl styrene, 2-chlorostyrene, 4-chlorostyrene, or 2,4-dichlorostyrene, and a minor proportion of acrylonitrile, for example, in accordance with the teachings of U. S. patent to Daly 2,439,202, in relative proportions typically ranging from 25 to 90% of the resinous copolymer and correspondingly from 75 to 10% of the rubbery copolymer. When from 50 to 90% of the resinous copolymer is used in such blends, the product is hard, tough and horny and in addition has high impact resistance.

Other compatible thermoplastic resins with which the rubbery copolymer can be blended, usually in proportions falling within the ranges just given, include polyvinyl chloride and copolymers of a major proportion of vinyl chloride and a minor proportion of another copolymerizable monomer, e. g., a copolymer of 85 to 95% of vinyl chloride with 15 to 5% of vinyl acetate, vinylidene chloride, or other copolymerizable monomer.

From the foregoing, it will be seen that our invention makes available to the art a simple, economical and commercially feasible process of making butadiene-acrylonitrile rubbery copolymers having the desirable characteristics described above. The invention makes it possible to control the content of desired gel in the product accurately at any desired level between 40 and 80% and at the same time to control the Mooney viscosity of the product at any desired value between 40 and 80. Thus, our invention enables the production of products which exhibit better processing characteristics and improved physical properties. Numerous other advantages of the invention will be apparent to those skilled in the art.

All percentages and proportions mentioned herein are by weight.

The values given herein for methyl ethyl ketone-insoluble gel, swelling index of such gel and Mooney viscosity are measured on samples of the rubbery copolymer which have been massed by milling at 360° F. for 5 minutes.

Having thus described our invention, what we claim and desire to protect by Letters Patent is:

1. A process of making a rubbery butadiene-acrylonitrile copolymer having a content of methyl ethyl ketone-insoluble gel of from 40 to 80%, said gel having a swelling index, measured in methyl ethyl ketone, of from 8 to 35, and a Mooney viscosity, measured at 212° F., of from 40 to 80, each of said values for gel content, gel swelling index and Mooney viscosity being determined on a sample which has been massed by milling for 5 minutes at 360° F., which comprises subjecting a mixture of butadiene and acrylonitrile to aqueous emulsion polymerization, initiating polymerization of said butadiene and acrylonitrile in the absence of a cross-linking agent, thereafter adding from 0.7 to 1.5% by weight, based on the butadiene and acrylonitrile, of divinylbenzene at a time when from 10 to 35% of the original monomer mixture has been converted to polymer, continuing the polymerization, and stopping the polymerization at a time when at least 60% but not more than 80% of said original monomer mixture has been converted to polymer.

2. A process of making a rubbery butadiene-acrylonitrile copolymer having a content of methyl ethyl ketone-insoluble gel of from 40 to 80%, said gel having a swelling index, measured in methyl ethyl ketone, of from 8 to 35, and a Mooney viscosity, measured at 212° F., of from 40 to 80, each of said values for gel content, gel swelling index and Mooney viscosity being determined on a sample which has been massed by milling for 5 minutes at 360° F., which comprises subjecting a mixture of butadiene and acrylonitrile to aqueous emulsion polymerization, initiating polymerization of said butadiene and acrylonitrile in the absence of a cross-linking agent, thereafter adding approximately 1% by weight, based on the butadiene and acrylonitrile, of divinylbenzene at a time when from 10 to 35% of the original monomer mixture has been converted to polymer, continuing the polymerization, and stopping the polymerization at a time when at least 60% but not more than 80% of said original monomer mixture has been converted to polymer.

3. A process of making a rubbery butadiene-acrylonitrile copolymer having a content of methyl ethyl ketone-insoluble gel of from 40 to 80%, said gel having a swelling index, measured in methyl ethyl ketone, of from 8 to 35, and a Mooney viscosity, measured at 212° F., of from 40 to 80, each of said values for gel content, gel swelling index and Mooney viscosity being determined on a sample which has been massed by milling for 5 minutes at 360° F., which comprises subjecting a mixture of butadiene and acrylonitrile to aqueous emulsion polymerization, initiating polymerization of said butadiene and acrylonitrile in the absence of a cross-linking agent, thereafter adding from 0.7 to 1.5% by weight, based on the butadiene and acrylonitrile of divinylbenzene at a time when from 20 to 30% of the original monomer mixture has been converted to polymer, continuing the polymerization, and stopping the polymerization at a time when at least 70% but not more than 75% of said original monomer mixture has been converted to polymer.

4. A process of making a rubbery butadiene-acrylonitrile copolymer having a content of methyl ethyl ketone-insoluble gel of from 40 to 80%, said gel having a swelling index, measured in methyl ethyl ketone, of from 8 to 35, and a Mooney viscosity, measured at 212° F., of from 40 to 80, each of said values for gel content, gel swelling index and Mooney viscosity being determined on a sample which has been massed by milling for 5 minutes at 360° F., which comprises subjecting a mixture of butadiene and acrylonitrile to aqueous emulsion polymerization, initiating polymerization of said butadiene and acrylonitrile in the absence of a cross-linking agent, thereafter adding approximately 1% by weight, based on the butadiene and acrylonitrile, of divinylbenzene at a time when from 20 to 30% of the original monomer mixture has been converted to polymer, continuing the polymerization, and stopping the polymerization at a time when at least 70% but not more than 75% of said original monomer mixture has been converted to polymer.

HENDRIK ROMEYN, Jr.
CHARLES D. McCLEARY.

REFERENCES CITED

The following references are of record in the file of this patent:

UNITED STATES PATENTS

| Number | Name | Date |
|---|---|---|
| 2,474,807 | Schoene | July 5, 1949 |